United States Patent
Burk

(10) Patent No.: US 7,384,012 B2
(45) Date of Patent: Jun. 10, 2008

(54) LONG-DISTANCE CASTING SPOOL FOR FISHING REELS

(76) Inventor: Günther Burk, Zur Fichtenbank 8, 51674 Wiehl (DE)

( * ) Notice: Subject to any disclaimer, the term of this patent is extended or adjusted under 35 U.S.C. 154(b) by 19 days.

(21) Appl. No.: 10/587,115

(22) PCT Filed: Jun. 22, 2005

(86) PCT No.: PCT/DE2005/001115

§ 371 (c)(1),
(2), (4) Date: Jul. 21, 2006

(87) PCT Pub. No.: WO2006/047974

PCT Pub. Date: May 11, 2006

(65) Prior Publication Data

US 2007/0278336 A1    Dec. 6, 2007

(30) Foreign Application Priority Data

Nov. 5, 2004    (DE) ................ 10 2004 054 033

(51) Int. Cl.
*A01K 89/01*    (2006.01)
(52) U.S. Cl. .............. 242/322; 242/614; 242/614.1
(58) Field of Classification Search ............. 242/322, 242/614, 614.1
See application file for complete search history.

(56) References Cited

U.S. PATENT DOCUMENTS

| | | | | |
|---|---|---|---|---|
| 2,973,917 A | * | 3/1961 | Fowler | 242/229 |
| 5,161,751 A | * | 11/1992 | Bolcavage | 242/322 |
| 5,558,288 A | * | 9/1996 | Brovelli | 242/172 |
| 5,697,567 A | | 12/1997 | Sonenvald | |
| 5,720,441 A | * | 2/1998 | Chamberlin et al. | 242/323 |
| 5,746,382 A | * | 5/1998 | Tsutsumi | 242/322 |
| 6,422,499 B1 | | 7/2002 | Bernard et al. | |
| 7,147,180 B1 | * | 12/2006 | Beard et al. | 242/614 |

FOREIGN PATENT DOCUMENTS

DE    4211145    10/1993

* cited by examiner

*Primary Examiner*—Emmanuel M Marcelo
(74) *Attorney, Agent, or Firm*—Fildes & Outland, P.C.

(57) ABSTRACT

The invention relates a long-distance casting spool 1 for fishing reels, with a spool body 2 comprising a spool base 3 and limit flanges 4, 5 on both sides, where limit flange 4 pointing in the run-off direction is provided with a radially outer spool lip 6, via which a fishing line that can be wound up in circumferential winding direction s perpendicular to spool axis a can run off in run-off direction z roughly parallel to spool axis a.

Figure 2:
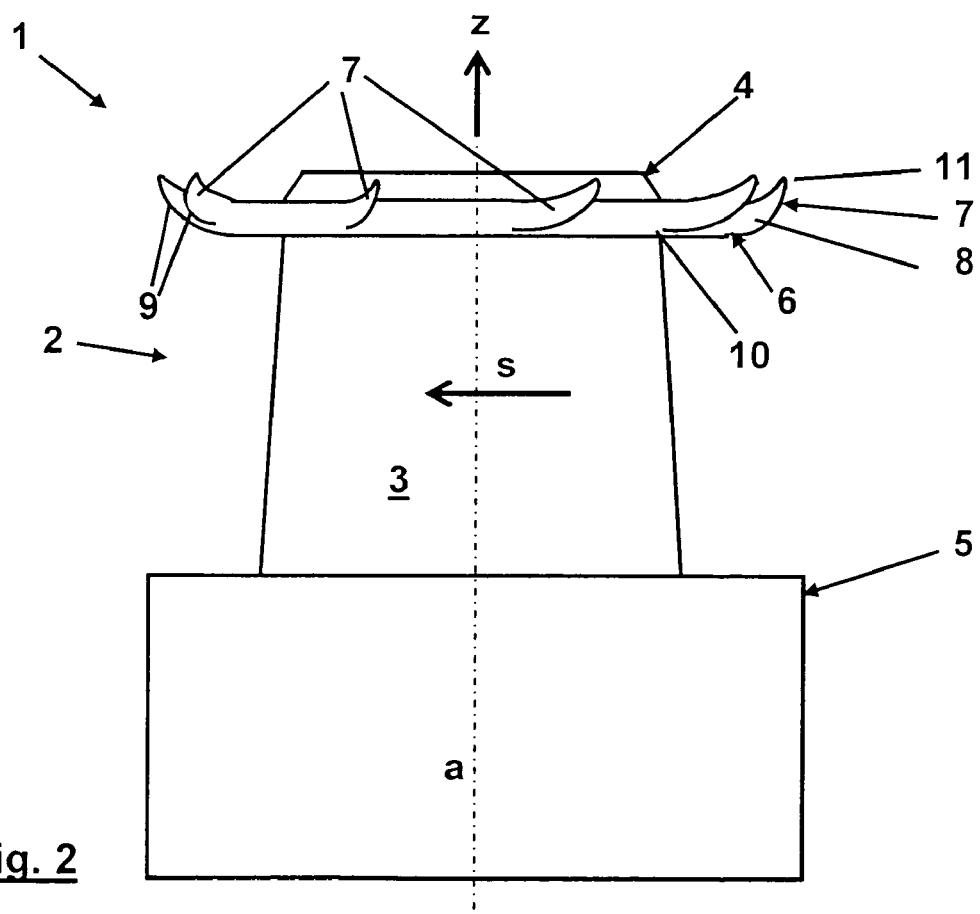

With the object of reducing the frictional resistance between the unwinding fishing line and spool lip 6, it is proposed that spool lip 6 display a number of retaining fins 7, distributed evenly over the circumference, that base end 8 of each retaining fin 7 be permanently connected to spool body 2, that the free ends of retaining fins 7 extend obliquely in the direction opposite to winding direction s, and that retaining fins 7 have a radially outer, longitudinal side designed as fin lip 9. (FIG. 2)

17 Claims, 2 Drawing Sheets

U.S. Patent    Jun. 10, 2008    Sheet 1 of 2    US 7,384,012 B2

LONG-DISTANCE CASTING SPOOL FOR FISHING REELS

The invention relates to a long-distance casting spool for fishing reels, with a spool body comprising a spool base and limit flanges on both sides, where the rear limit flange in the run-off direction is provided with a radially outer spool lip, via which a fishing line that can be wound up in the circumferential winding direction perpendicular to the spool axis can run off in the run-off direction roughly parallel to the spool axis.

Long-distance casting spools of the kind mentioned in the opening paragraph enable a fishing bait, connected to the free end of the fishing line located on the long-distance casting spool, to be positioned at distant points. The long-distance casting spool is customarily located in the fishing reel with its axis of rotation perpendicular to the longitudinal axis of a fishing rod. The circumferential winding direction thus runs perpendicular to the axis of rotation of the long-distance casting spool, or to the longitudinal axis of the fishing rod. When winding up the fishing line, the fishing line is diverted via a deflection device, from the run-off direction, running roughly parallel to the axis of rotation, into the winding direction, running perpendicular to the axis of rotation. In order to achieve the longest possible distances with a weight, bait or the like attached to the free end of the fishing line during long-distance casting, the deflection device is generally swung in such a way that the fishing line unwinds from the long-distance casting spool and, in this context, runs off the long-distance casting spool in the run-off direction directly via the limit flange, or via the spool lip, without the help of the deflection device. Since the fishing line is unwound and runs off via the limit flange, the rear limit flange is of essential importance as a lateral support for the wound-up fishing line, in order to prevent uncontrolled, simultaneous unwinding of several turns of the fishing line from the long-distance casting spool, which can lead to tangling of the fishing line.

A decisive influence on the achievable distance that the fishing bait can be cast is exerted by the frictional conditions between the rear limit flange or the spool lip and the fishing line. To reduce the frictional resistance, the limit flange with the spool lip is designed with a smaller diameter on newer long-distance casting spools. To nonetheless preserve the fishing line capacity, the longitudinal extension of the spool base is enlarged. However, this does not solve the main problem, i.e. that of the frictional resistance on the spool lip. The more fishing line runs off the long-distance casting spool, the greater the distance becomes between the current surface of the wound-up fishing line and the spool lip. The frictional resistance is at its lowest when the long-distance casting spool is full, immediately after casting. As the quantity of line remaining on the long-distance casting spool decreases, the resistance at the spool lip increases, and the fishing line is strongly braked.

To reduce the friction, DE 4 211 145 A1 proposes that the fishing line on the long-distance casting spool be held laterally by two radially opposite segments, one end of which is mounted in pivoting fashion on springs on the long-distance casting spool. The object of this is that the unwinding line presses the segments radially inwards, against the spring pressure, in such a way that, as the quantity of line decreases, the radial distance from the radial surface of the current quantity of line on the long-distance casting spool to the segment remains consistently small at all times. According to DE 4 211 145 A1, it is expected that the frictional resistance is substantially lower as a result, and the line is braked to a lesser degree. It can be assumed, however, that the fishing line wound up in the area of the segments is tightened between the segments, as a result of which the shape in which the fishing line is wound up can be disrupted, at least in this area, this possibly leading at least to increased friction during unwinding, if not even to incorrect run-off of the fishing line with the consequence of the aforementioned tangling.

The object of the present invention is thus to provide a long-distance casting spool of the kind mentioned in the opening paragraph, on which the frictional resistance between the unwinding winding fishing line and the spool lip is reduced.

According to the invention, the object is solved in that the spool lip displays a number of retaining fins, distributed evenly over the circumference, in that the base end of each retaining fin is permanently connected to the spool body, in that the free ends of the retaining fins extend obliquely in the direction opposite the winding direction, and in that the retaining fins have a radially outer, longitudinal side designed as a fin lip.

As a result, the unwinding fishing line only picks up friction at the fin lips and, in this context, particularly in the area of the free fin ends, meaning that the frictional resistance is substantially lower, the fishing line therefore being braked to a correspondingly lesser extent. Consequently, the long-distance casting spool according to the invention is capable of achieving longer and more accurate casting distances, without having to use heavier casting weights.

The retaining fins can be provided with a run-off arch inclined in the run-off direction of the windable fishing line. This run-off arch achieves more gentle, transitionless and thus more frictionless sliding of the fishing line on the retaining fins.

In this context, the run-off arch preferably displays a continuous profile, i.e. one without steps, shoulders or the like. In order to reduce the friction, it is preferable to polish at least the surface of the run-off arch provided as the running surface for run-off of the fishing line.

In a development of the long-distance casting spool, at least four retaining fins are provided. If the number of retaining fins is too small, there is the danger of the distances between the retaining fins becoming too large, as a result of which the fishing line can tighten greatly between the retaining fins and be wound up incorrectly.

Preferably, at least nine retaining fins are provided. It has become apparent in this context that, with nine retaining fins, a certain optimum can be achieved as regards the functions of the retaining fins, in that the retaining fins retain the fishing line wound up on the long-distance casting spool and put up the least possible frictional resistance to the fishing line as it runs off. It goes without saying that a smaller number of retaining fins than four can also be provided and prove to be optimum, e.g. in the event of the diameter of the spool base being further reduced, or a greater number than nine, e.g. if the diameter of the spool base is enlarged.

An embodiment of the long-distance casting spool is preferred, in which the retaining fins extend obliquely in the direction opposite the winding direction of the windable fishing line at a fin angle of less than 90°, said angle being formed at the base end of the respective retaining fin, between the circumferential tangent and the slope of the fin lip or the longitudinal axis of the retaining fin at its base end. The fin angle preferably displays a value between 30° and 60°, more preferably a value between 40° and 50°, and particularly preferably a value in the region of 45°. The run-off behaviour of the fishing line is influenced via the fin angle. If the fin angle is greater than or equal to 90°, there is the danger of the fishing line getting caught at the root. The smaller the fin angle becomes, the more easily the fishing line can run off from the long-distance casting spool. If the angle is very small, it is necessary, in order to provide an advantageously large spool volume, for the fin length to be correspondingly great, meaning that the friction can be disadvantageously increased as a result. Consequently, a fin angle with a medium value in the region of 45° is considered to be optimum. However, this does not mean that a correspondingly different value of the angle cannot prove to be optimum, given correspondingly different frictional conditions between the fishing line and the spool lip or fin lip.

In a development, provision is made for the base of the retaining fin to display, at least on its rear side in the winding direction, i.e. at the transition from the long-distance casting spool to the fin lip, a transition with a continuous, curved profile without shoulders, step, edges or the like. This can be accomplished, for example, in the form of a curvature with a radius of curvature pointing away from the long-distance casting spool, or a curvature that is concave in the radially outward direction. As a result of this transition, the retaining fin can emerge tangentially from the rear limit flange, such that the fin angle becomes zero in relation to the circumferential tangent and the slope of the fin lip at the base end of the retaining fin, but remains unequal to zero in relation to the circumferential tangent and the slope of the longitudinal axis of the retaining fin at its base end.

The fin lip can preferably display a continuously curved profile file over its longitudinal extension, at least one direction component of whose radius of curvature points towards the spool base. The fin lip thus has a convex curvature in the radially outward direction. This, in turn, makes it possible to achieve reduced friction in comparison with a straight profile with a constant slope.

It is further preferred for the free fin end to project radially farthest beyond the spool base. This prevents the underside of the free fin end from possibly acting as a barb or the like and thus constituting a threat to correct run-off of the fishing line. In this context, however, the retaining fins of the rear flange should preferably at most project radially beyond the spool base as far as the front flange of the long-distance casting spool in the run-off direction.

Preferably, the retaining fins can in each case display a triangular shape, one tip of which forms the free fin end and the side of which opposite the tip is permanently connected to the long-distance casting spool. As a result, the retaining fin displays a maximum cross-section at its base, where maximum moments of force are expected to occur, and a minimum cross-section at its tip, where minimum moments of force are expected to occur, meaning that the shape is roughly adapted to the expected profile of the moments of force.

In a development of the long-distance casting spool, the retaining fins can in each case be designed as a triangle with a sickle-shaped tip that forms the free end of the retaining fins. This yields a shape similar to that of the dorsal fin of a shark, where the free fin side opposite the fin lip displays a curved profile similar to that of the fin lip. This achieves further optimisation of the fin shape as regards the necessary strength of the retaining fin and minimisation of the frictional conditions between fin lip and fishing line since, compared to a triangular shape with straight sides, the lateral surface of the retaining fin, with which the windable fishing line comes into contact, is reduced in the base area, as a result of which the friction surface, and thus the possible frictional force in this area, is reduced, while the free end has a sufficiently large cross-section determining its strength. If, in a further development, a transition, described in more detail above, is additionally provided in the profile of the retaining fin emerging from the spool body in the form of a profile line that is concave in relation to the spool body and transitions continuously into the convex fin lip profile, the result is a roughly S-shaped profile of the fin lip. In this context, the other end of the profile line preferably transitions, in a continuously curved profile, into the side of the adjacent retaining fin facing away from the fin lip.

The fin lips can preferably be ground in the run-off direction of the windable fishing line. In this context, grinding can be performed in a manner similar to a knife ground on one side, but preferably with a curved grind profile in the cross-sectional view. In addition, a rounded tip is preferred. Furthermore, provision is preferably made for the ground edge between the rounded grind profile and the non-ground side of the retaining fin to be slightly rounded off, in order to counteract a potential risk of injury. This further optimisation of the retaining fins and the fin lips moreover reduces the friction between the fishing line and the fin lip.

The diameter of the spool base can decrease towards the limit flange with the retaining fins, preferably decreasing in linear fashion in this context. This results in a circumferential inclined plane, on which the windable fishing line presses against the retaining fin with a force component, this facilitating correct winding and unwinding of the fishing line.

The retaining fins can be attached to the rear limit flange in detachable fashion. This offers the advantage that the retaining fins can be replaced, singly or as a whole, meaning that, for example, the desired number of retaining fins on the rear flange can be changed, retaining fins with a different shape or a different material structure fitted, or damaged retaining fins replaced. The retaining fins can be screwed to the rear limit flange in this context.

The rear limit flange can be connected to the long-distance casting spool in detachable fashion. In this context, the rear limit flange can be manufactured as a separate component that can be installed in the long-distance casting spool in detachable fashion. As a result, the rear limit flange can, for example, be replaced by a limit flange with a different number of retaining fins, retaining fins of a different shape or retaining fins made of particularly wear-resistant and/or low-friction material or, in case of damage, by an identical limit flange. Teflon, for example, would be open to consideration as a material for minimising the frictional losses between the fishing line and the limit flange. To enable replacement of the rear limit flange, the rear limit flange can, for example, be designed as a disc that can be slid onto the face end of the long-distance casting spool and fixed in place. In particular, the long-distance casting spool can be of the conventional, three-part design, comprising rear limit flange, spool base with front limit flange, and fastening device for laterally press-fitting and/or clamping the rear limit flange against the face end of the spool base.

In an alternative embodiment, the long-distance casting spool can be manufactured in one piece, as a result of which the manufacturing costs can be reduced. Being a lightweight material, aluminium can preferably be used for this purpose. Furthermore, the aluminium die casting method is preferred as a low-cost manufacturing method for the long-distance casting spool. To further reduce friction, at least the surface of the fin lip can preferably be polished.

The retaining fins can additionally be manufactured from a friction-reducing material, or coated with a friction-reducing material. The material used can, for example, be anodised aluminium, which is preferably polished smooth, at least on the fin lip. Teflon, for example, is open to consideration as a friction-reducing coating material.

Figure 1:
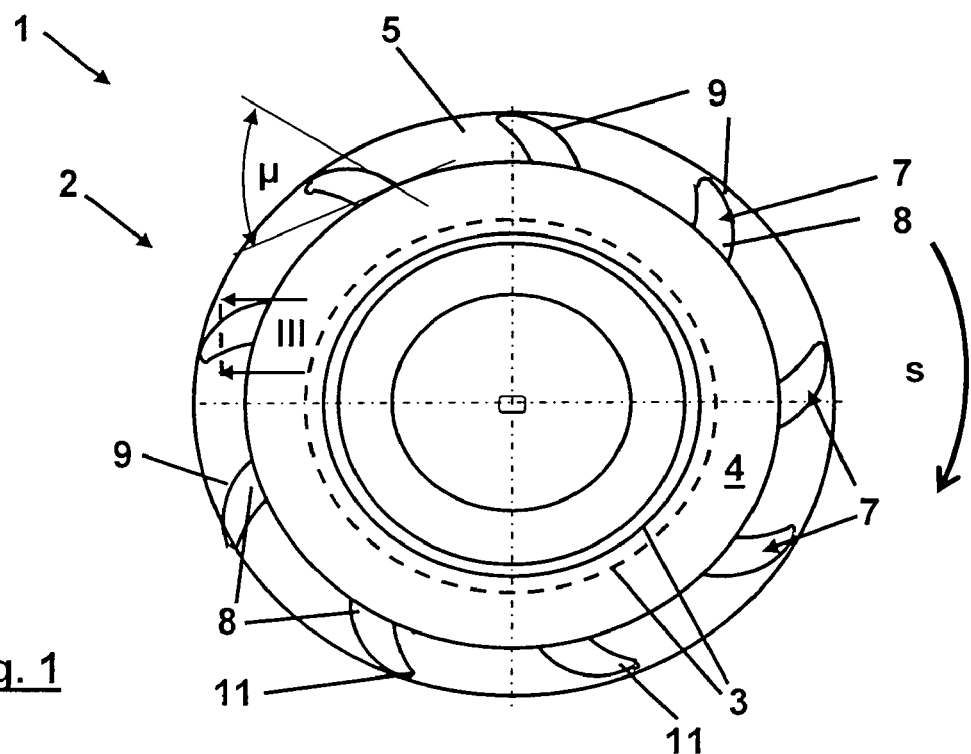
Figure 3:
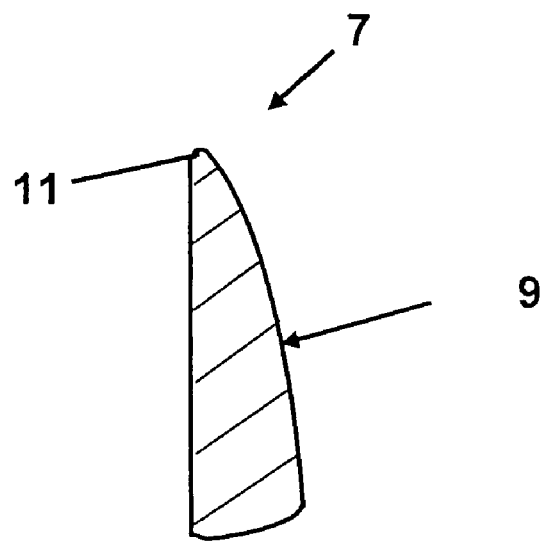
Figure 4:
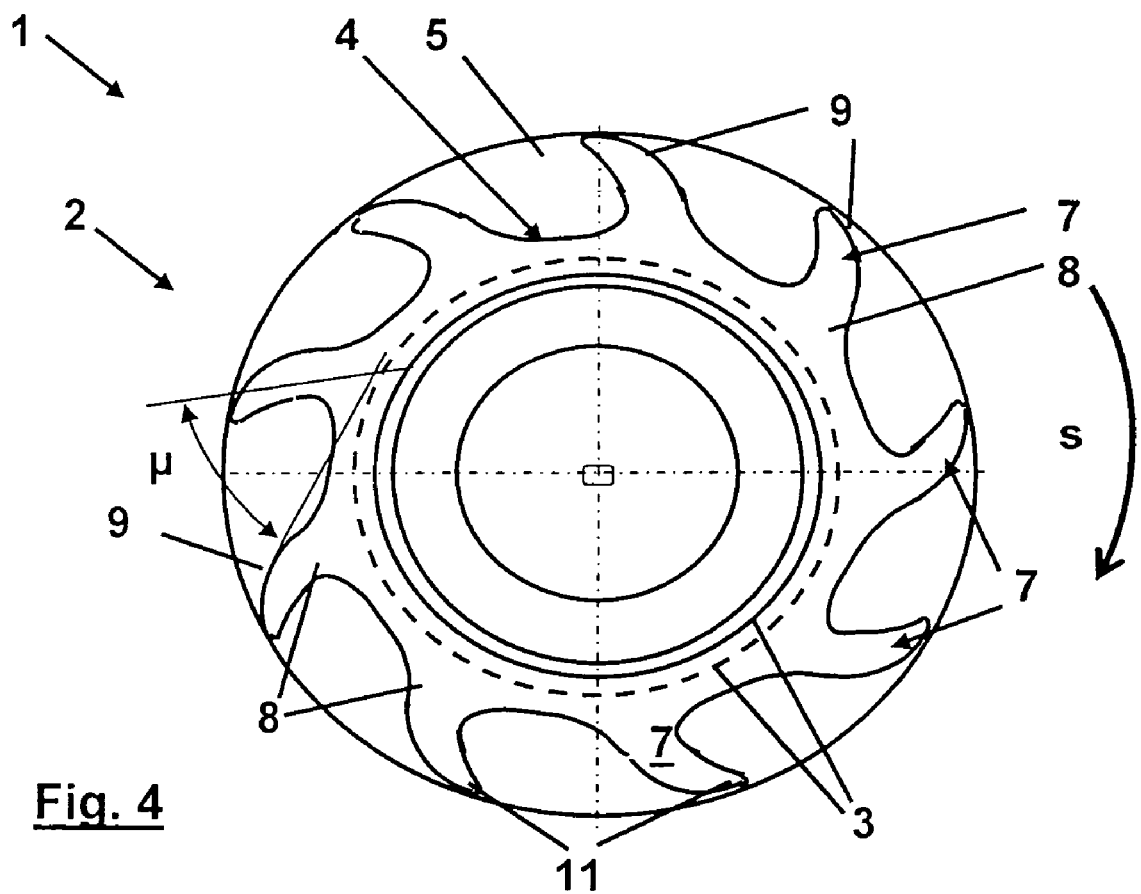

Two practical examples of the present invention are described in more detail below on the basis of an associated drawing. The drawings show the following:

FIG. 1 A face-end view of a long-distance casting spool in a first embodiment,

FIG. 2 A side view of the long-distance casting spool according to FIG. 1,

FIG. 3 A retaining fin in a cross-sectional view along line III-III in FIG. 1, and FIG. 4 A face-end view of the long-distance casting spool in a second embodiment.

FIGS. 1 and 2 show a first embodiment of a long-distance casting spool 1 for fishing reels in a face-end view and a side view, respectively. Long-distance casting spool 1 displays a spool body 2 with a spool base 3 and limit flanges 4, 5 on both sides, a rear limit flange 4 in run-off direction z of a fishing line not shown here, and a front limit flange 5 in run-off direction z of the fishing line not shown here. Rear limit flange 4 is provided with a radially outer spool lip 6.

It is envisaged that the fishing line not shown here can be wound up onto long-distance casting spool 1 in a circumferential winding direction s perpendicular to spool axis a. Furthermore, the long-distance casting spool is designed in such a way that, in installed position, its spool axis a is arranged roughly parallel to the longitudinal axis of a fishing rod not shown here, where, during winding, the fishing line can be deflected, via a deflection device not shown here, from run-off direction z in the direction of the longitudinal axis of the fishing rod into winding direction s, and thus roughly perpendicular to run-off direction z.

In contrast, in order to avoid frictional losses during the long-distance casting of a fishing bait or the like at the free end of the fishing line by means of long-distance casting spool 1, provision is made for the fishing line not shown here to be able to run off directly via radially outer spool lip 6 in run-off direction z, roughly parallel to spool axis a, without being deflected via the deflection device. Rear limit flange 4 is necessary as a retaining and guiding device in order to guarantee correct run-off of the fishing line via limit flange 4. The frictional losses on rear limit flange 4 have to be minimised in order to achieve the greatest possible casting distances.

To reduce the friction between the fishing line not shown here and spool lip 6 during the run-off process in long-distance casting, provision is made for spool lip 6 to display nine retaining fins 7, evenly distributed around the circumference, which are each permanently connected to long-distance casting spool 1 at their base end 8, and extend obliquely in a direction opposite circumferential winding direction s at their free end. The respective, radially outer longitudinal side of retaining fins 7 is designed as a fin lip 9, via which the fishing line not shown here runs off during long-distance casting. In this context, the fishing line only picks up friction on fin lips 9 as it runs off, and, depending among other things on the amount of line remaining on long-distance casting spool 1, only in the area of the free fin ends, as a result of which the friction is lower as a whole and the fishing line is braked to a correspondingly lesser extent. Consequently, long-distance casting spool 1 according to the invention is capable of achieving greater and more accurate casting distances with the same casting weights, compared to conventional long-distance casting spools.

Rear limit flange 4, displaying fin lip 9, is provided with a run-off arch 10, which transitions into retaining fins 7, extends obliquely in run-off direction z, and via which the un-winding fishing line is deflected into run-off direction z over a gentle, friction-reducing profile, and supported. In the embodiment of long-distance casting spool 1 illustrated here, run-off arch 10 is designed roughly as a circular arc. Instead of this shape of a circular arc, the run-off arch can also have a different, continuous profile, i.e. a profile without steps, shoulders or the like, such as a parabolic or oval arc-shaped profile.

The nine retaining fins 7 are distributed evenly around the circumference, i.e. arranged, in a cross-section of long-distance casting spool 1, at equal distances on the circular arc, corresponding to an angle of 40° not indicated here. In this context, the number of retaining fins 7 presented here constitutes a certain optimum in the given geometrical conditions as regards the friction of the fishing line not shown here on retaining fins 7, and as regards the retaining function of retaining fins 7 necessary for correct winding and unwinding of the fishing line on long-distance casting spool 1, lateral retention of the fishing line on the long-distance casting spool and correct run-off of the fishing line in run-off direction z via the fin lips.

Retaining fins 7 extend in the direction opposite to winding direction s, at a fin angle p that is formed at base end 8 of the respective retaining fin 7 between the circumferential tangent shown in FIG. 1 and the slope of fin lip 9 at base end 8. In this context, fin angle μ is preferably smaller than 90°, since the danger otherwise exists of the fishing line not shown here getting caught or sticking at the base end when running off in run-off direction z. Fin angle μ should be between 30° and 60°, preferably between 40° and 50°, more preferably in the region of 45°. In the example illustrated here, fin angle μ is roughly 50°.

Retaining fins 7 display a roughly triangular shape with similarly curved sides, which converge to form a sickle-shaped tip 11 similar to the dorsal fin of a shark. This shape is considered to be advantageous since, compared to a triangle with straight sides, it is relatively slender with a correspondingly small friction surface in the area of the base end, and displays a cross-section of sufficient strength in the area of the free end. Tips 11 themselves are of rounded design in order not to constitute a risk of injury.

As shown in FIG. 3, a cross-section along line III-III in FIG. 1, retaining fin 7 with fin lip 9 is ground in run-off direction z, the grind profile being rounded and displaying a rounded edge in order to counteract a risk of injury. In this practical example, the rounding of the grind profile is roughly that of an oval, but can, for example, also be roughly parabolic or display a different profile with lessening curvature from the base end to the tip.

As can clearly be seen in FIG. 2, in particular, the diameter of spool base 3 decreases in linear fashion towards retaining fins 7. Since this produces a circumferential inclined plane, which is inclined in run-off direction z, a fishing line not shown here that is wound up on long-distance casting spool 1 is lightly pressed against limit flange 4 with retaining fins 7, as a result of which the fishing line can more easily run off correctly in run-off direction z.

FIG. 4 shows a face-end view of a second embodiment of the long-distance casting spool. In this context, the second embodiment differs from the first one, described above, in that it has a special design of retaining fins 7 or base ends 8 of retaining fins 7, which, compared to the first embodiment pursuant to FIG. 1, reach radially deeper into rear limit flange 4 and display a different transition to rear limit flange 4.

In the first embodiment according to FIG. 1, retaining fins 7 emerge from rear limit flange 4 without a transition, as a result of which an edge is formed between the respective base end 8 of retaining fins 7 and the rear limit flange. In the second embodiment shown in FIG. 4, on the other hand, a transition is provided, thereby avoiding steps, edges or the like, such that the fishing line not shown here can run off via fin lip 9 with less hindrance and less friction. In this instance, the transition displays a profile that is curved radially inwards, or a concave line, one end of which continuously transitions into the convex fin lip shape explained on the basis of FIG. 1, resulting in a roughly S-shaped profile of the fin lip. The other end of the line transitions in a continuously curved profile into the side of the next retaining web 7 that faces away from fin lip 9, such that rear limit flange 4 as a whole has a radially outer profile similar to that of a saw blade.

It goes without saying that provision can also be made for the retaining fins not to reach so deeply into rear limit flange 4, such that the lower layers of a windable fishing line are retained laterally by the circumferentially continuous side wall of the rear limit flange. The retaining fins can, however, also be designed in such a way that they reach radially into the rear limit flange down to the spool base.

LIST OF REFERENCE OF NUMBERS

1 Long-distance casting spool
2 Spool body
3 Spool base
4 Rear limit flange
5 Front limit flange
6 Spool lip
7 Retaining fin
8 Base end
9 Fin lip
10 Run-off arch
11 Tip
a Spool axis
s Winding direction
z Run-off direction
μ Fin angle

The invention claimed is:

1. Long-distance casting spool for fishing reels, with a spool body comprising a spool base and limit flanges on both sides, where the limit flange pointing in the run-off direction is provided with a radially outer spool lip, via which a fishing line that can be wound up in the circumferential winding direction perpendicular to the spool axis can run off in the run-off direction roughly parallel to the spool axis, characterized in that the spool lip displays a number of retaining fins, distributed evenly over the circumference, in that the base end of each retaining fin is permanently connected to the spool body, in that the free ends of the retaining fins extend obliquely in the direction opposite the winding direction, and in that the retaining fins have a radially outer, longitudinal side designed as a fin lip.

2. Long-distance casting spool according to claim 1, characterized in that the retaining fins are provided with a run-off arch inclined in the run-off direction of the fishing line arrangeable on the long-distance casting spool.

3. Long-distance casting spool according to claim 1, characterized in that at least four retaining fins are provided.

4. Long-distance casting spool according to claim 1, characterized in that at least nine retaining fins are provided.

5. Long-distance casting spool according to claim 1, characterized in that the retaining fins extend from the spool body at a fin angle of less than 90°, said fin angle being formed at the base end of the respective retaining fin, between the circumferential tangent and the slope of the fin lip.

6. Long-distance casting spool according to claim 5, characterized in that the fin angle has a value between 30° and 60°.

7. Long-distance casting spool according to claim 5 characterized in that the fin angle has a value between 40° and 50°.

8. Long-distance casting spool according to claim 5, characterized in that the fin angle is in the region of 45°.

9. Long-distance casting spool according to claim 1, characterized in that the fin lip displays a continuously curved profile, at least one direction component of whose radius of curvature points towards the spool base.

10. Long-distance casting spool according to claim 1, characterized in that the retaining fins in each case display a triangular shape, one tip of which forms the free fin end and the side of which opposite the tip is permanently connected to the long-distance casting spool.

11. Long-distance casting spool according to claim 10, characterized in that the retaining fins are in each case designed as a triangle with a sickle-shaped tip.

12. Long-distance casting spool according to claim 1, characterized in that the fin lips are ground in the run-off direction of the windable fishing line.

13. Long-distance casting spool according to claim 1, characterized in that the diameter of the spool base decreases towards the rear limit flange with the retaining fins.

14. Long-distance casting spool according to claim 1, characterized in that the retaining fins are attached to the rear limit flange in detachable fashion.

15. Long-distance casting spool according to claim 1, characterized in that the rear limit flange is connected to the long-distance casting spool in detachable fashion.

16. Long-distance casting spool according to claim 1, characterized in that the long-distance casting spool is manufactured in one piece.

17. Long-distance casting spool according to claim 1, characterized in that at least the retaining fins are manufactured from a friction-reducing material, or coated with a friction-reducing material.

* * * * *